Patented Feb. 17, 1931

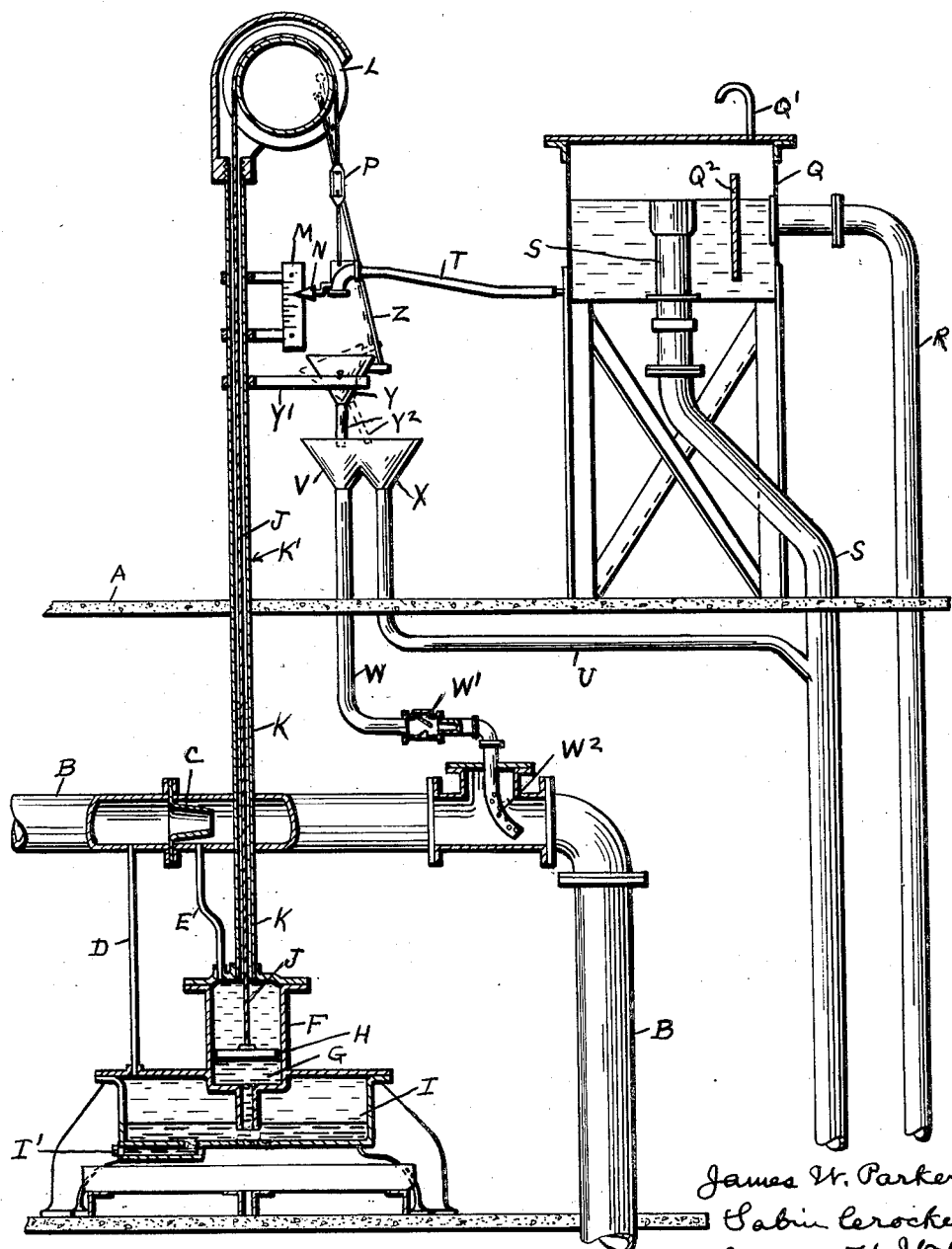

1,792,757

UNITED STATES PATENT OFFICE

JAMES W. PARKER, OF WASHTENAW COUNTY, SABIN CROCKER, OF MOUNT CLEMENS, AND JAMES H. WALKER, OF DETROIT, MICHIGAN

PROPORTIONING DEVICE

Application filed May 11, 1929. Serial No. 362,278.

The invention relates to apparatus for regulating the relative rate of flow of fluids through two or more conduits through which they simultaneously pass. Specifically, the invention has to do with means whereby the rate of flow obtained in one or more of these conduits is made the determining factor governing the rate of flow then prevailing in one or more of the other conduits, the device herein shown and described illustrating an application of both the general principle and the specific means just referred to.

The single figure of drawing illustrates partly elevationally and partly in section the embodiment of our improved construction.

Two pipes or conduits of different sizes are made appurtenant to suitable supply sources of two different fluids respectively. The larger pipe will be referred to as the main pipe, the second and smaller as the auxiliary pipe. There is introduced into the main pipe a restriction in cross section constituting a Venturi tube, flow nozzle or orifice plate, these being well known in the hydraulic art. Conditioned upon this tube's being completely filled at all points with the fluid being conveyed, the flow of fluid through the tube induces differences of fluid pressure at different points spaced along its length. The differences in fluid pressure between two such points definitely spaced vary with the flow of fluid through the tube according to a well known hydraulic law. By pipes suitably connected to these definite points, these differences of pressure can be made to determine the positions of a float located in a mercury-filled float chamber, to be described later, in such manner that the position of the float will vary in accordance with the well-known law of the Venturi tube already referred to.

In the piping system comprising the auxiliary circuit there is introduced a tank in which the fluid is maintained at a constant level, and an orifice in the flexible discharge pipe from this tank, whose vertical postion is adjustable with respect to the water level in the tank. The flow through the orifice varies with its distance below the fluid level according to a well-known hydraulic law. There is a certain relation between this law and the law of the Venturi tube, so that if the above mentioned float whose position is determined by the Venturi differential is mechanically connected so as to regulate the position of the movable orifice, then the flow of fluid in the auxiliary pipe can be made to bear any predetermined relation to the flow in the main pipe.

Subject to proper emphasis upon the possible variations in the specific structure which individual installations may render advisable, the structure illustrated herein may be described as comprising a floor or ground level A at a suitable distance beneath which extends a water supply pipe B which is provided with a flow nozzle C, which is a well-known commercial article operating on the Venturi principle. Leading from the pipe B on either side of the flow nozzle C is a lead pipe D and a trailing pipe E communicating respectively with the cylinders F and I which with the tube F' form virtually a U tube which contains a mass of mercury or other fluid G. The diameter of the cylinder I is made much larger than that of cylinder F so that nearly the entire mercury deflection produced by the Venturi effect will take place in F. There is introduced upon the bottom and top respectively of the mercury mass G a balance influence responsive to the rate of flow through the flow nozzle C. On the top of the mercury mass rests a float or raft H, from which rises a cable J which is sheathed or guided within the surrounding tubing K, the upper end of the cable passing over the roller or pulley L which is rotatably supported at a suitable height above the ground level A; near the top of the sheathing K is supported a gauge M along the markings on which passes the indicator arrow N which is adjustably suspended as by means of the turn buckle connection P from the end of the cable J and thus rising and falling in obedience to induced variations in the mercury level. By the use of the riser tube K of such appreciable height that the water level therein from the pipe E and chamber F can rarely, if ever, exceed some such intermediate point as K' for example, we are enabled to avoid the use of a stuffing box or packing gland which would introduce friction, since, as brought out clearly in the drawing, the cable J is appreciably and adequately spaced from the surrounding sides of the tube K so that no question of friction is involved.

Supported on the floor or ground level A in convenient relation thereto is the acid or other supply tank Q which is fed from the pipe R, and into the center of which rises the overflow pipe S through which any excess of the acid furnished through the pipe R may make its way back to the source from which the supply fed through the pipe R is located. A vent Q' if desired may be placed at the top of the tank. From this acid tank extends a flexible or jointed delivery pipe T whose end is connected to the orifice block or head which carries the gauge arrow N, the orifice being positioned axially above the flared open top of the funnel Y which is pivotally supported by the bracket Y', and whose delivery tube is in turn positioned above the flared open top of the fixed funnel piece V from which leads the supply pipe W, which may be provided, if desired, with a check valve W' and whose perforated delivery end $W^2$ extends into the extension of the pipe B well beyond the position therein of the flow nozzle C. The fixed funnel V preferably has built integral with it a waste funnel X from which the pipe U leads into the return pipe S.

In our development of the above described apparatus we have availed ourselves of the well-known law of the Venturi tube to the effect that the mercury deflection in a U-shaped tube connected as herein shown varies as the difference in the squares of the velocities of flow, in this case that of the main pipe B as contrasted with the throat C. We have also made use of the fact that a pressure induced flow through an outlet in a container appreciably below the top surface of the fluid therein varies as the square root of the effective head, thus by selection of the proper size of current meter and of the diameter of the outlet pipe T, or, if preferred, a suitably constricting nozzle or orifice thereof, we are able to so correlate the above described parts that, when the relation of the pressure transmitted through the pipes D and E respectively is such as to lower the float H sufficiently to draw the cord J downwardly as far as possible, thus, because of the passage of the latter over the pulley L drawing the turn buckle connection P up as far as possible, the delivery end of the pipe T is so raised relatively to the fluid level in the acid tank Q that no flow therefrom can pass through the pipe T. As an additional safeguard, we preferably pivot as through the medium of the bracket $Y^1$, the funnel Y which normally lies directly below the delivery end of the pipe T and connects its edge with the roller or pulley L by means of the link Z, so that when the end of the cable J is drawn to the high position just described, the link 2 is also drawn upwardly, thus tilting the funnel Y until its delivery spout Y' is swung to a position over the branch or auxiliary receiving funnel X, which is connected by the pipe U with the return pipe S already mentioned, thus harmlessly diverting any undesired surplus flow of the acid from proceeding through the funnel V and pipe W into the pipe B. When, however, the rise of the float H permits the dropping of the delivery end of the pipe T to a point where the gravity-induced flow from the acid tank Q may proceed, the latter drops into the funnel Y whence it proceeds through the pipe W in the desired proportionate quantity for commingling with the water which has been passed through the flow nozzle C in the pipe B.

What we claim is:

A proportioning apparatus having in combination with a fluid supply pipe, a flow nozzle positioned therein, pipes leading from said fluid supply pipe on either side of said flow nozzle, a mercury column with isolated portions of which said pipes are operatively related, a second fluid supply pipe, means operatively dependent upon the action of said mercury column under the influence of the pressures existing in the pipes whereby the lowered or elevated position of said second supply pipe is automatically regulated, means for receiving the flow from said second fluid supply pipe and for conducting the same to a point in said first named fluid supply pipe beyond the location therein of said flow nozzle and said pipe connections, and means operatively dependent on the lifting or lowering movement exerted by the mercury column upon the second fluid supply pipe whereby the fluid supplied therefrom is diverted from discharge into said first named fluid supply pipe if there is no flow of fluid in progress therethrough.

In testimony whereof we sign this specification.

JAMES W. PARKER.
SABIN CROCKER.
JAMES H. WALKER.